(12) United States Patent
Pruett et al.

(10) Patent No.: US 8,860,242 B1
(45) Date of Patent: Oct. 14, 2014

(54) POWER-LINE COMMUNICATION COUPLING

(75) Inventors: Henry F. Pruett, North Bend, OR (US); Vincenzo DiTommaso, Beaverton, OR (US); Ravindranath Naiknaware, Portland, OR (US); Jorell A. Olson, Portland, OR (US)

(73) Assignee: SolarBridge Technologies, Inc., Austin, TX (US)

( * ) Notice: Subject to any disclaimer, the term of this patent is extended or adjusted under 35 U.S.C. 154(b) by 835 days.

(21) Appl. No.: 12/907,800

(22) Filed: Oct. 19, 2010

Related U.S. Application Data

(60) Provisional application No. 61/326,203, filed on Apr. 20, 2010, provisional application No. 61/291,637, filed on Dec. 31, 2009.

(51) Int. Cl.
*H02J 1/00* (2006.01)
*H02J 3/00* (2006.01)

(52) U.S. Cl.
USPC .......................................................... 307/5

(58) Field of Classification Search
CPC ........ H04B 3/00; H04B 3/02; H04B 2203/00; Y02E 10/563; Y02E 10/50; Y02E 10/566; Y02E 10/56; H02J 3/383; Y02B 10/14; Y04S 10/123; Y04S 10/24
USPC .......................................... 307/1, 3, 5, DIG. 1
See application file for complete search history.

(56) References Cited

U.S. PATENT DOCUMENTS

| | | | |
|---|---|---|---|
| 2009/0000654 A1* | 1/2009 | Rotzoll et al. | 136/244 |
| 2010/0127570 A1* | 5/2010 | Hadar et al. | 307/77 |
| 2011/0084553 A1* | 4/2011 | Adest et al. | 307/63 |

OTHER PUBLICATIONS

Gohari, J., "Standard Handbook for Electrical Engineers: Power-Link Carrier," Twelfth Edition, McGraw-Hill Book Company, 1987, 9 pages.

* cited by examiner

*Primary Examiner* — Carlos Amaya
(74) *Attorney, Agent, or Firm* — Barnes & Thornburg LLP

(57) ABSTRACT

In some embodiments, a system includes a power system coupled to a power bus, and a power line communication (PLC) gateway coupled in series with the power bus. In other embodiments, a system includes first and second power circuits coupled in series with a power bus, and first and second power-line communication circuits coupled in series with the power bus. In additional embodiments, a system includes a power converter coupled to a power bus and having one or more switching frequencies, and a power-line communication circuit coupled to the power bus and having one or more communication frequencies, where at least one of the switching frequencies is substantially greater than at least one of the communication frequencies.

26 Claims, 13 Drawing Sheets

POWER-LINE COMMUNICATION COUPLING

CROSS-REFERENCE TO RELATED APPLICATIONS

This application claims priority from U.S. Provisional Patent Application Ser. No. 61/326,203 titled Power Line Communication Coupling filed Apr. 20, 2010 and U.S. Provisional Patent Application Ser. No. 61/291,637 titled Power-Line Communication Coupling filed Dec. 31, 2009.

BACKGROUND

Power-line communication (PLC) techniques enable systems, subsystems and components to communicate by exchanging information, typically through the use of radio frequency energy, over power lines whose primary purpose is the transmission of power. The information is transmitted using a power-line carrier which is typically a high-frequency signal that is superimposed on the normal waveform used for the transmission of power.

Power-line communications are commonly used for monitoring and supervisory control purposes such as remote metering, remote control of unattended power stations, automatic load control, and demand response systems. These types of command-and-control functions are increasingly important in smart-grid applications. Power-line communications are also used to transmit information that is unrelated to the underlying power system. For example, power-line communications may be used to carry voice and data traffic over existing power lines in rural areas where dedicated telephone, cable or optical transmission media may be prohibitively expensive to install.

Coupling circuits are crucial components for power-line communications because they enable the carrier signal to be superimposed on the normal power signal. A power-line coupling circuit must provide a path for information to flow between the power lines and a power-line communication circuit, while protecting the sensitive electronics in the communication circuit from the high voltage and current levels on the power lines.

FIG. 1 illustrates a typical prior-art system in which power sub-systems S1, S2, . . . , Sk, . . . , SN share an AC or DC power-line for exchanging power between the sub-systems and/or a power source/sink. Power may flow out of any of the sub-systems that generate power or convert power from other power sources, while power may flow into any of the sub-systems that consume power. Power flow may also be bi-directional into and out of any sub-systems that have the capability of both supplying and consuming power.

Each of the sub-systems S1, S2, . . . , Sk, . . . , SN includes a power-line communication module 10 to establish one or more communication channels over the power-lines and enable communications between any of the sub-systems and other components in a variety of ways such as one-to-one, one-to-many, many-to-many and many-to-one strategies. In addition, one or more network gateways 12 may be included to concentrate data and/or interface to other network functionality such as Internet access, data-servers, remote network management, etc.

In a typical system as shown in FIG. 1, the sub-systems S1, S2, . . . , Sk, . . . , SN are connected in parallel, and therefore the line communication modules 10 include power-line coupling interfaces that are designed for parallel connections. The power line current and voltage capabilities can vary based on the application. For example, in a smaller distributed control application, the voltage and current magnitudes could be a few volts to a few amperes, respectively. In other applications, these voltages can be as high as a few hundreds volts and a few hundred amperes, respectively. However, the circuitry in the on-board communication module 10 within each of the sub-systems S1, S2, . . . , Sk, . . . , SN operates at low-voltages. Thus, the circuitry must be isolated from the detrimental voltage and current levels present on the power lines, while simultaneously providing an effective path for coupling communication signals to the power lines.

FIG. 2 illustrates a prior art implementation of the on-board communication module 10 within each of the systems shown in FIG. 1. The power-line is coupled to receive and transmit sections of a communication transceiver using line interface circuit 16. The transceiver is interfaced to the sub-system through a digital data interface 18. For the transmit chain, the digital data is first modulated using special hardware, a digital signal processor (DSP), I/O multiplexer or any other suitable hardware 20. The modulated digital data is then converted to analog form using a digital-to-analog converter 22. The signal so obtained is processed with a filter 24, a buffer 26, a driver 28 and driven onto the power-line through the line interface circuits 16 which may include line-coupling circuitry such as isolation barriers as described below. For the receive section, the input signal received from the receive line coupling circuit is processed through a low-noise amplifier (LNA) 30, a filter 32 and an automatic gain-control AGC amplifier 34 before converting to digital form using an analog-to-digital converter 36. The digital data is then processed by the dedicated hardware, DSP, etc. The digital hardware 20 can interact with a variety of digital circuits for sending and receiving data to and from other parts of the system.

Some typical implementation details of the line interface circuit 16 of FIG. 2 are shown in FIG. 3. An isolation barrier 38 protects the transmit and receive signal paths from the high voltages and/or currents on the power lines. A receive line filter 40 and a transmit line filter 42 provide appropriate impedance match while simultaneously achieving correct in-band and out-band spectral characteristics. The circuit of FIG. 3 is typically arranged to provide a broadband match between the impedance seen looking into the PLC circuit and the impedance seen looking into the power line. For example, to accommodate commonly used PLC frequencies, the PLC circuit may be designed to provide flat frequency response between 50 KHz and 100 KHz with the response rolling off at rapidly below 50 KHz and above 100 KHz.

An example implementation of an isolation barrier 38 is shown in FIG. 4. A high-voltage capacitor C is arranged in series with the primary side of a transformer T1 to connect with the power-line between terminals W1 and W2. Bi-directional diode-based 44 clamps may be used to protect the circuits from surges. The secondary side of the transformer may be center tapped for creating balanced differential signals at terminals C1 and C2 relative to a ground connection at the center tap for interfacing to the receive and transmit line filters, respectively.

Some example implementation details of the receive and transmit line filters 40 and 42 are shown in FIG. 5. These circuits provide appropriate impedance match across three ports of the circuits including the interface to the receive section LNA 30, the transmit section driver 28, and the isolation barrier 38. Passive RLC receive circuits 46 are appropriately tuned to operate in specific communication bands and frequencies with appropriate bandwidths on the communication channel. The filters are collectively optimized such that the communication signals across I1 and I2 are as high as possible, but small enough to be safely connected to low-voltage levels utilized by the PLC integrated circuit (IC) chip. Similar consideration is given to the RC combinations in the transmit filter 42 for transmitting maximum power from the on-chip high-power low-impedance drivers of the transmit section. Additionally, the resistors in the transmit filter 42 may be used for current sensing. Additional protection circuitry as shown in FIG. 6 can be placed at nodes I1 and I2.

FIG. 7 illustrates the details of an entire prior art system implementation. Each of the main sub-systems S1, S2, . . . , SN has an associated PLC system including a line coupling circuit 46, receive line connect circuit 48, transmit line connect circuit 50 and a low-voltage IC communication device 52. All of the sub-systems are connected in parallel on an AC or DC power line bus. A gateway 12 is interfaced to the power-lines through interface circuit 54 which is essentially a duplicate of the PLC systems associated with each of the sub-systems.

DETAILED DESCRIPTION

Figure 8:
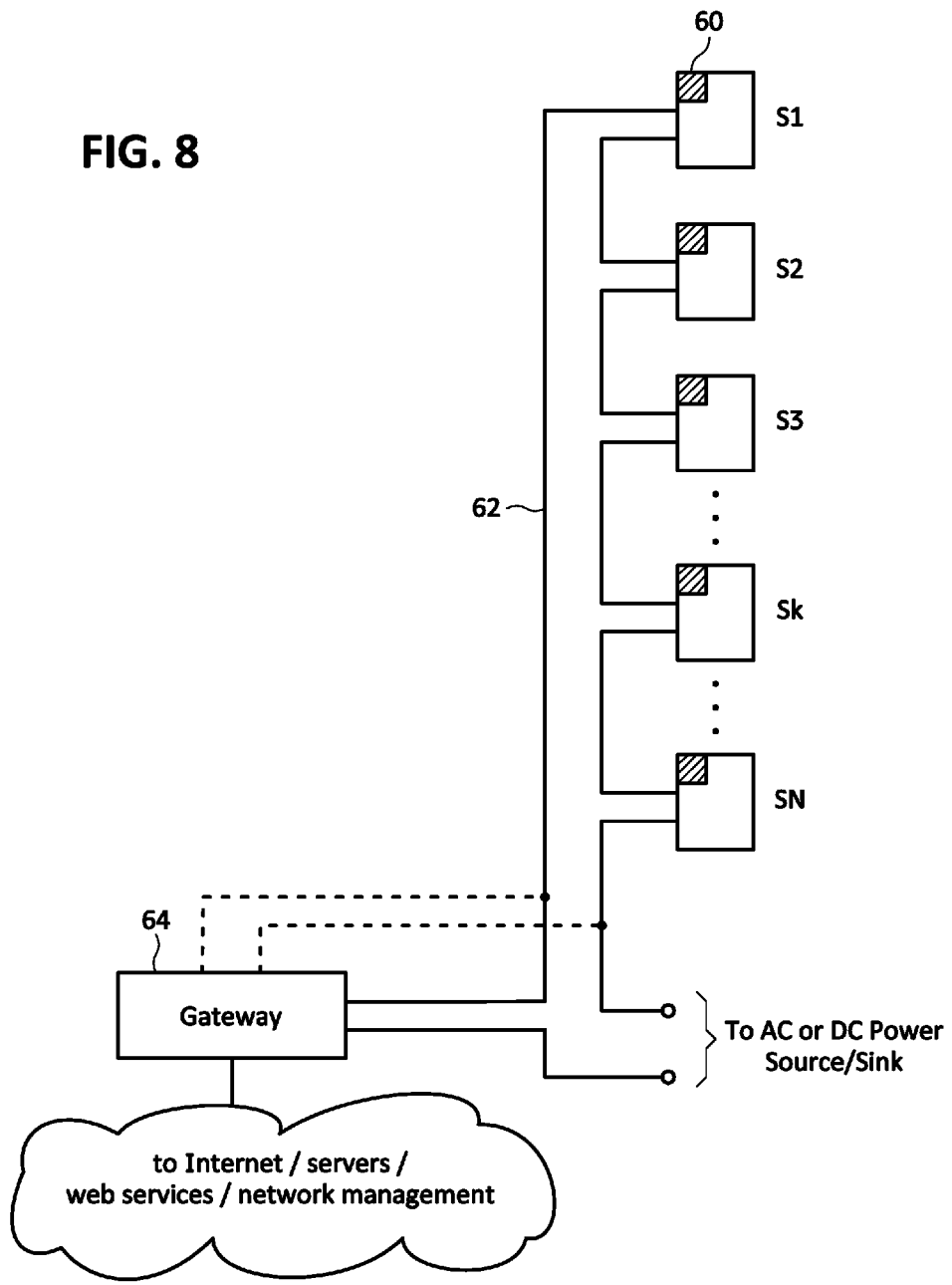
FIG. 8 illustrates an embodiment of a power system according to some inventive principles of this patent disclosure.

FIG. 8 illustrates an embodiment of a power system according to some inventive principles of this patent disclosure. Power sub-systems S1, S2, . . . , Sk, . . . , SN are connected to a power bus 62 with their power connections in a series arrangement. The sub-systems may include apparatus that provides power to the bus such as power sources, power converters, etc., or apparatus that draws power from the bus such as electrical loads. The power sub-systems may also be bi-directional apparatus, for example energy storage elements such as batteries, regenerative motors, flywheels, etc. In one example embodiment, the sub-systems may include photo-voltaic (PV) systems and/or lighting systems.

Each sub-system includes a power-line communication module 60. In the embodiment of FIG. 8, the communication modules, each of which includes a power-line communication coupling, are connected to the power bus 62 in series. A gateway 64 may be coupled to the power bus in a series as shown in solid lines, or in parallel as shown by the dashed lines.

Figure 9:
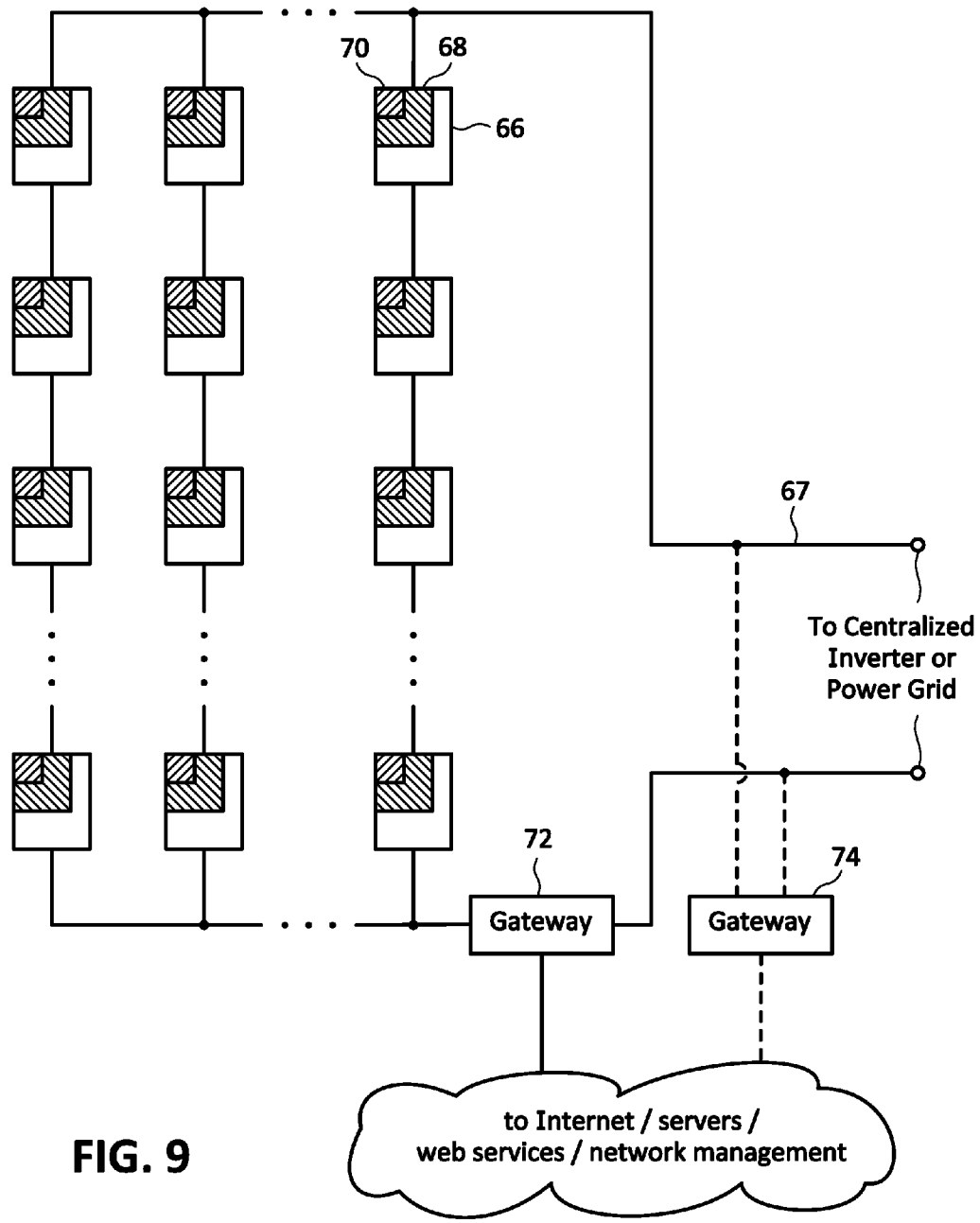
FIG. 9 illustrates another embodiment of a power system according to some inventive principles of this patent disclosure.

FIG. 9 illustrates another embodiment of a power system according to some inventive principles of this patent disclosure. The embodiment of FIG. 9 is illustrated in the context of a photovoltaic (PV) system having multiple strings of series/parallel connected PV panels 66 that provide power to an AC or DC power bus 67. Each panel includes a local power optimizer 68 and power-line communication module 70. If the power bus 67 is implemented as an AC bus, then each panel 66 would also include an inverter to convert the DC output from the PV panel to AC power. A power-line communication gateway 72 is connected in series with the power bus 67. An additional or alternative power-line communication gateway 74 may be connected in parallel with the power bus.

The local power optimizers can be installed at each panel or at sub-strings within the panels. In some implementations, such optimizers may be installed at each of the cells within the solar module. Furthermore, each of the PV modules (or the strings and/or cells within the PV Modules) can generate DC voltages or AC voltages (with an inverter), and can be combined in series to create higher voltages to be connected to a centralized inverter or to a utility grid, respectively.

As with the embodiment of FIG. 8, the power-line communication modules 70 may include isolated line coupling circuits that are connected in series to enable communication panels and gateways.

Figure 1:
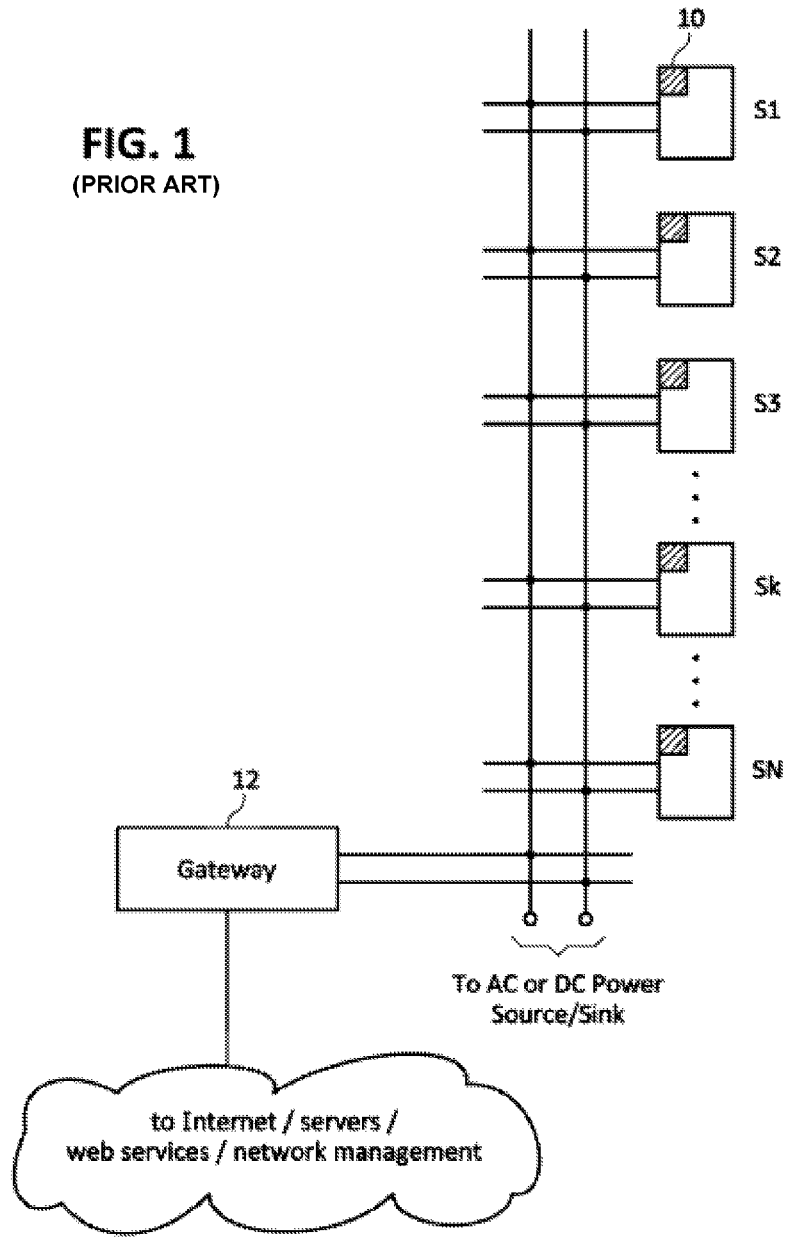
FIG. 1 illustrates a prior art power system with power line communications.
Figure 2:
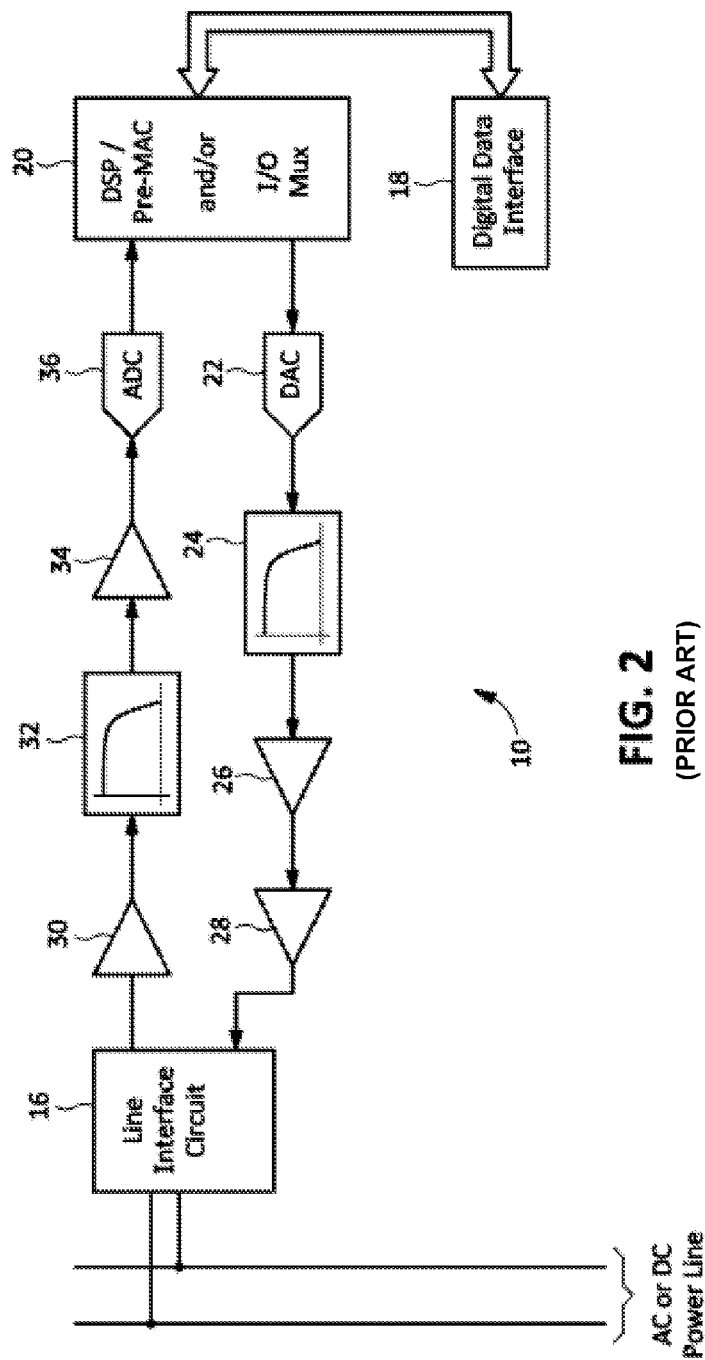
FIG. 2 illustrates a prior art power-line communication module.
Figure 3:
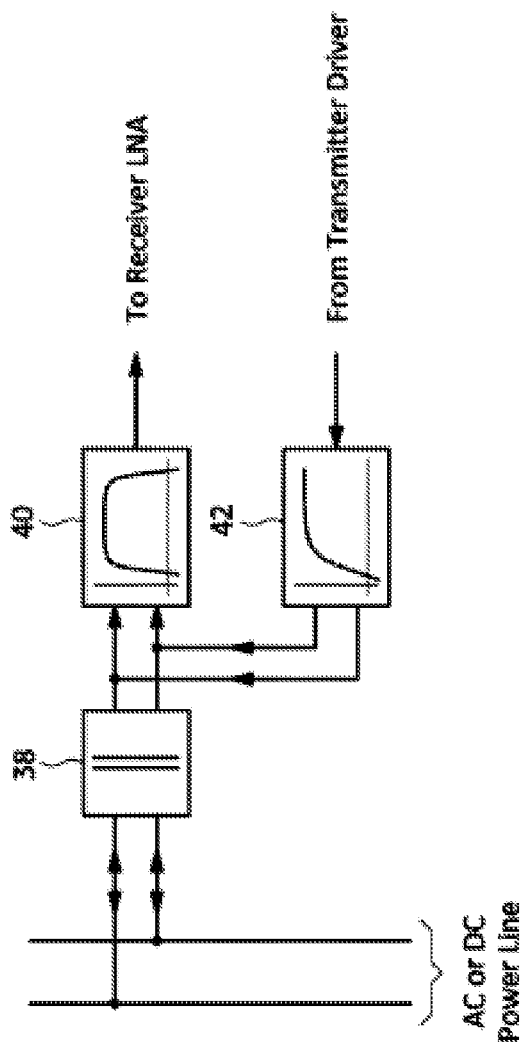
FIG. 3 illustrates a prior art the line interface circuit.
Figure 4:
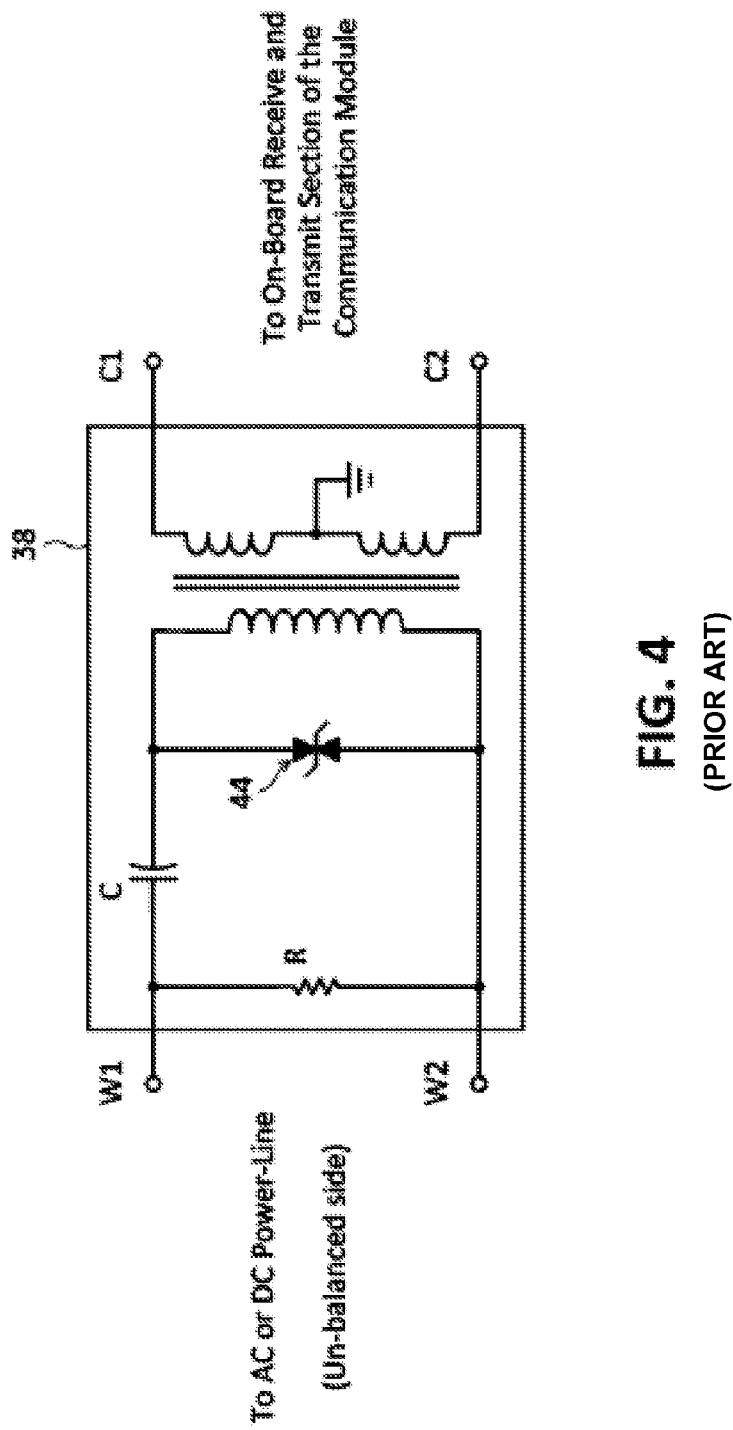
FIG. 4 illustrates a prior art isolation barrier.
Figure 5:
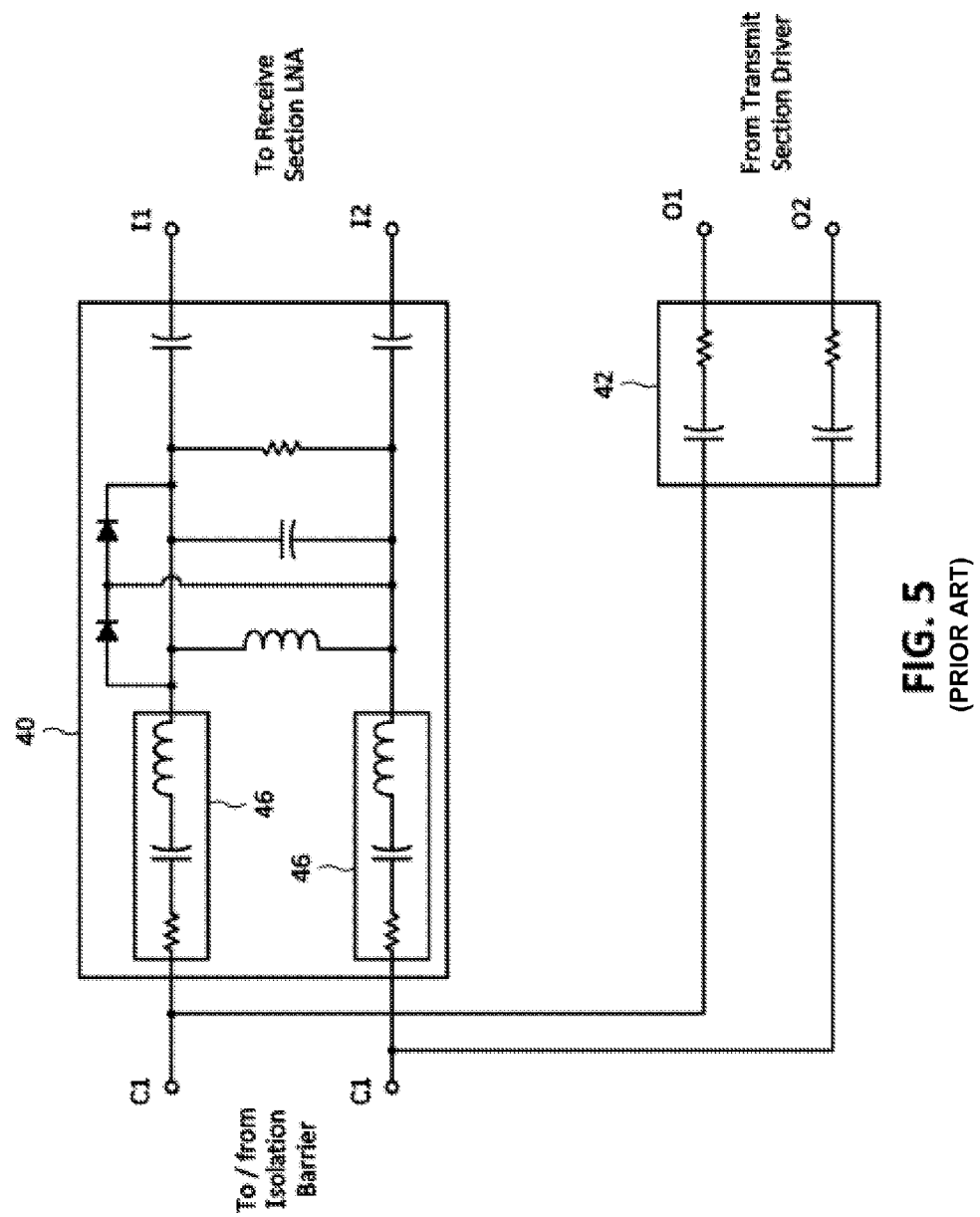
FIG. 5 illustrates prior art receive and transmit line filters.
Figure 6:
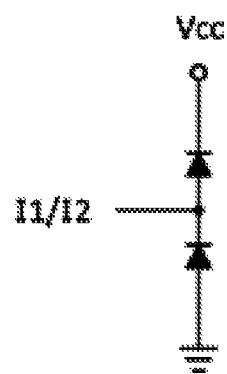
FIG. 6 illustrates prior art protection circuitry.
Figure 7:
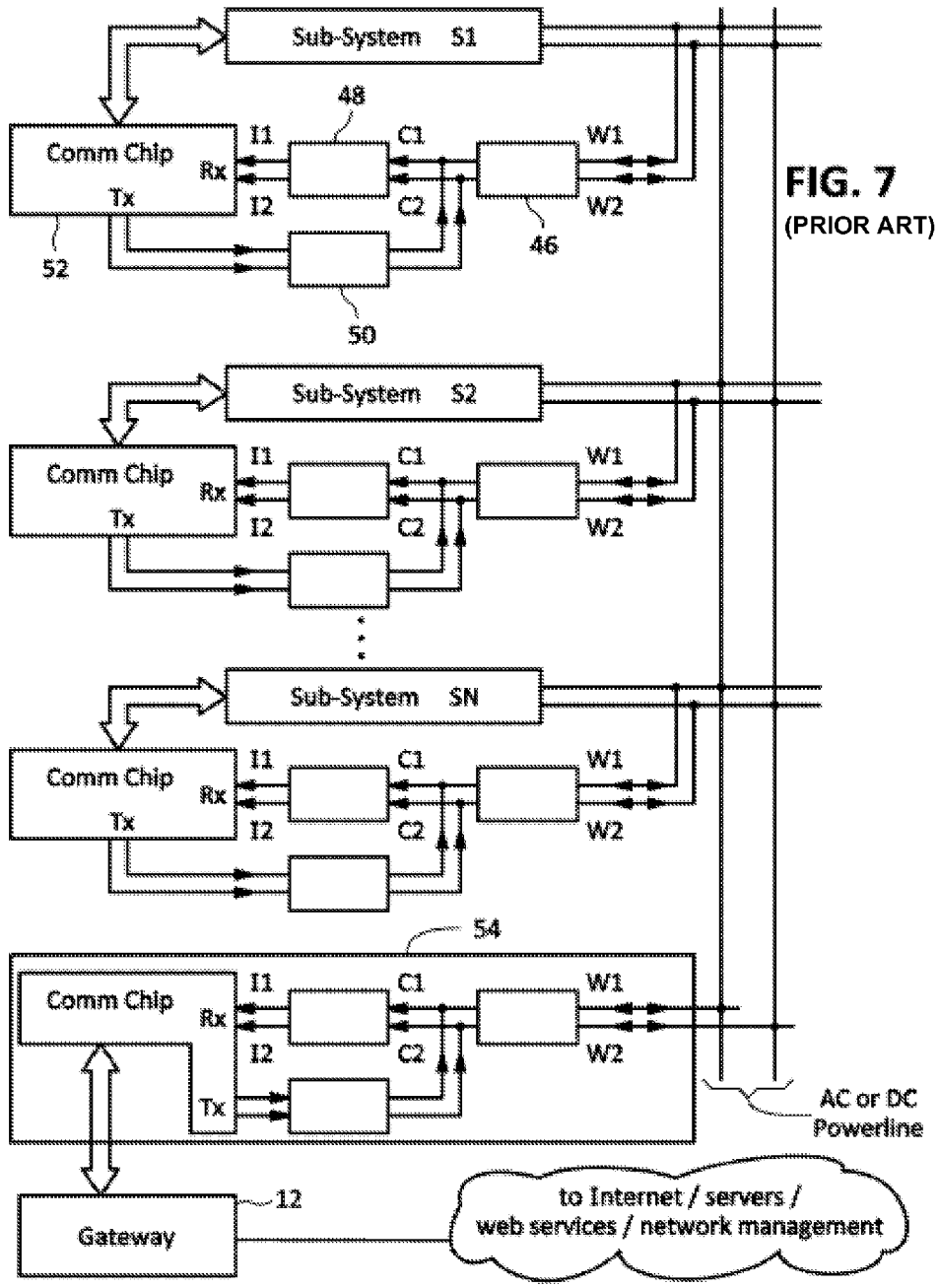
FIG. 7 illustrates entire prior art power system implementation with power line communications.

The design of coupling circuits for systems having series-connected power lines as shown in FIGS. 8 and 9 may present some special challenges as compared to parallel-connected systems. For example, with a parallel system as shown in FIG. 1, the characteristic impedance of the power channel is essentially constant, and each power-line coupling circuit sees the same impedance regardless of the operating conditions of the power sub-systems. With a series-connected system as shown in FIG. 8, however, each sub-system may see a different impedance looking into the power line. Moreover, the power line channel, which was originally intended as a power channel is now being re-used as a communication channel, and the impedances seen at the individual sub-systems may change depending on the operating conditions of the sub-systems.

Thus, a power-line coupling circuit for use with a series-connected power line may preferably be designed to provide a relatively constant impedance at the communication frequencies, regardless of where the coupling circuit is located on the power line, and regardless of changes in impedance at the power frequencies due to shading or other variations in operating conditions, thereby enabling communications at a constant PLC frequency, or at multiple frequencies within a PLC band.

Figure 10:
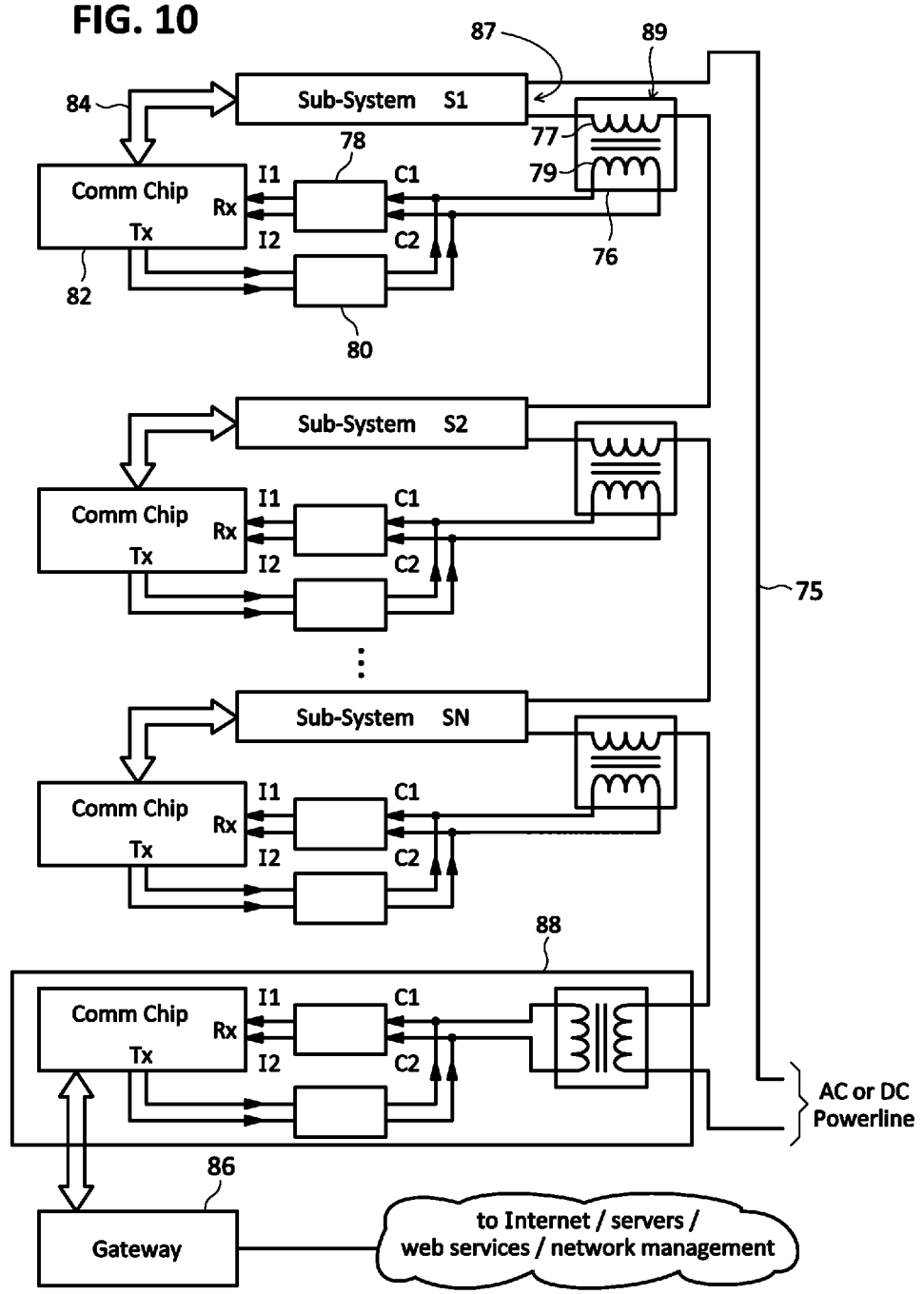
FIG. 10 illustrates another embodiment of a power system according to some inventive principles of this patent disclosure.

FIG. 10 illustrates another embodiment of a power system according to some inventive principles of this patent disclosure. In the embodiment of FIG. 10, each of the main sub-systems S1, S2, . . . , SN is connected in series to a power bus 75 and has an associated PLC system including a series-connected line coupling circuit 76, a receive line connect circuit 78, a transmit line connect circuit 80 and a low-voltage power-line communication IC chip 82. Each PLC chip is interfaced to the associated system through a digital interface 84. All of the sub-systems are connected in series on an AC or DC power line bus 75. A gateway 86 is interfaced to the power-lines through an interface circuit 88 which is essentially a duplicate of the PLC systems associated with each of the sub-systems. Each subsystem exchanges power through interface 87 and communicates through interface 89.

Each line coupling circuit 76 includes a series connected primary winding 77. A power amplifier in the communication interface may be directly coupled to the secondary winding 79 in the transformer through a transmit line filter. The receive section may be interfaced through a receive line connect filter. Any suitable receive and transmit line filters may be used.

A potential advantage of the embodiment of FIG. 10 is that it may enable power-line communication between series-connected components while respecting the nuances of the channel impedance.

Figure 11:
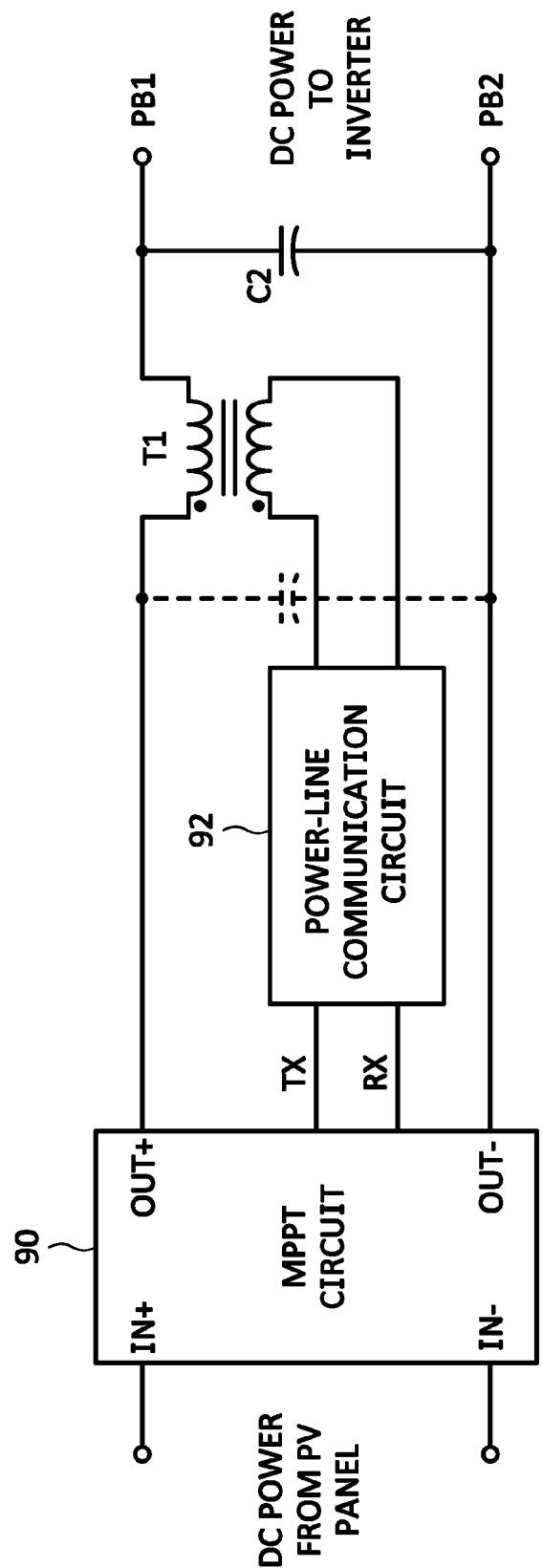
FIG. 11 illustrates an another embodiment of a series-connected power-line coupling circuit according to some inventive principles of this patent disclosure.

FIG. 11 illustrates an another embodiment of a series-connected power-line coupling circuit suitable for use with a series-connected power line according to some inventive principles of this patent disclosure. The embodiment of FIG. 11 is illustrated in the context of a PV power system in which each PV panel includes a maximum power point tracking (MPPT) circuit 90. A coupling transformer T1 includes a primary winding coupled between a first output terminal OUT+ of the MPPT circuit and a first terminal PB1 for connecting to the power bus. The transformer secondary is coupled to a power-line communication circuit 92 which interfaces to the MPPT circuit through transmit TX and receive RX signals. The power-line communication circuit 92 may derive its operating power from the MPPT circuit or any other suitable source. A second output terminal OUT− of the MPPT circuit is connected directly to a second terminal PB2 for connecting to the power bus. Although shown as a separate component, capacitor C2 may essentially function as an output capacitor for the MPPT circuit and may alternatively be connected on the other side of the transformer T1 as shown with dotted lines.

The use of series-connected power-line couplings as shown in FIGS. 10 and 11 may be particularly beneficial in systems in which each gateway, PV panel, or other power sub-system does not have access to a ground reference. The use of series-connected power-line couplings may also be beneficial in that it may provide a current-dominated form of signal which may facilitate easier configuration and interaction of the system for more effective communication between components. Moreover, series-connected power-line couplings may facilitate the design of couplings with the proper impedance for maximizing power coupling with the power-line bus because the impedance seen looking into the bus depends on the other components present on the bus in any particular installation.

A further benefit of series-connected power-line couplings is that they may enable the use of identical couplings and/or entire power-line communication systems for all or many of the components coupled to the power bus, thereby reducing the number of different types of components required for an installation, reducing manufacturing, stocking, distribution and/or installation costs, improving uniformity and ease of installation, etc. For example, in the example embodiment of FIG. 10, the same couplings and/or power-line communication systems may be used for each sub-system S1, S2, . . . , Sk, . . . , SN, as well as the gateway interface 88.

Figure 12:
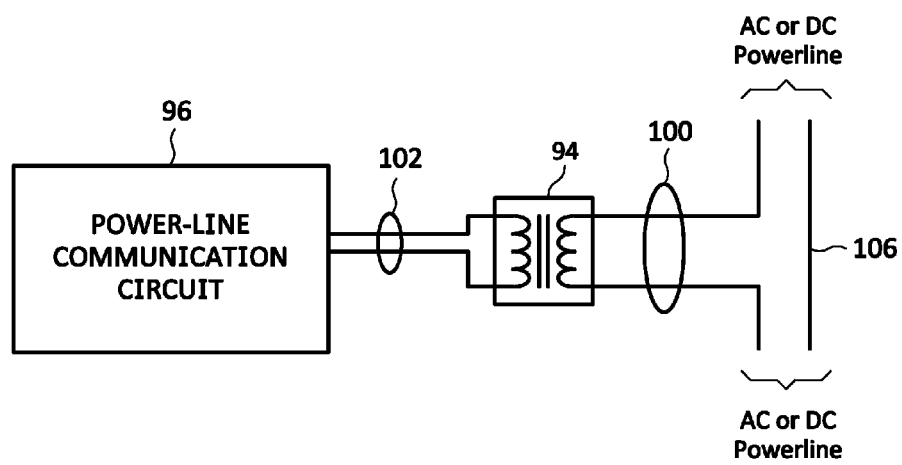
FIG. 12 illustrates an example embodiment of a series-connected coupling circuit according to some inventive principles of this patent disclosure.

Another potential benefit of a series-connected power-line coupling is that it may enable the implementation of systems in which all or part of the coupling is realized as a physically separate component. This may be better understood with reference to FIG. 12 which illustrates an example embodiment of a series-connected coupling circuit according to some inventive principles of this patent disclosure. The coupling circuit includes a transformer 94 having a primary winding coupled in series with an AC or DC power bus 106. The transformer may be implemented with a housing that is separate from the housing used for the remainder of the coupling circuit. Thus, the transformer 94 may be located physically close to the power bus 106, thereby eliminating or minimizing the high-voltage wiring 100 required to install the transformer. The remaining connections may then be implemented with low-voltage wiring 102 which may be significantly easier and less expensive to install.

In one example embodiment, the transformer 94 may be implemented with a toroidal core in which a few turns, or even a single pass, of high voltage conductor 100 passes through the core. The low voltage wiring 102 may then be connected to any suitable number of turns of secondary winding on the core. If such a core is installed on a suitable conductor of the power bus during installation, the further secondary-side connections and modifications may be made without requiring any breaks in the high-voltage wiring.

Yet another potential benefit of a series-connected power-line coupling is that, in a transformer-based implementation, the turns ratio may be adjusted to optimize coupling and communication performance. This may be particularly advantageous with implementations in which communications are unidirectional as the turns ratio may be better optimized for systems in which communications will only be received or only be transmitted.

Figure 13:
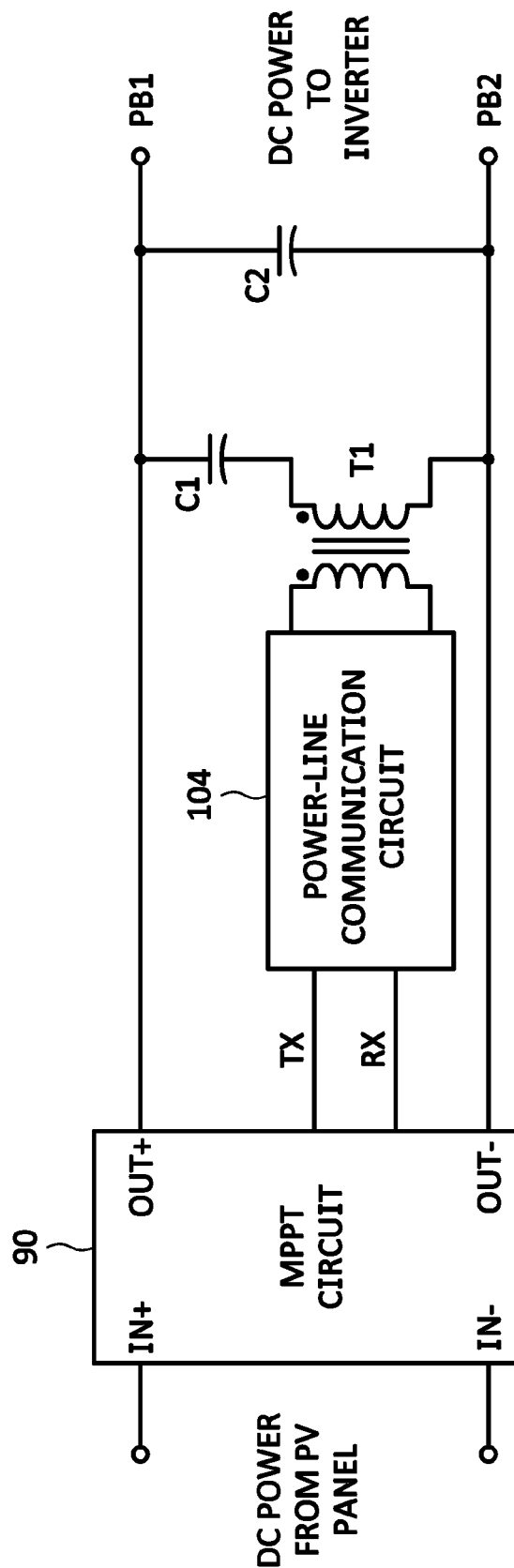
FIG. 13 illustrates another embodiment of a series-connected power-line communication coupling according to some inventive principles of this patent disclosure.

FIG. 13 illustrates another embodiment of a series-connected power-line communication coupling according to some inventive principles of this patent disclosure. The embodiment of FIG. 13 is also illustrated in the context of a PV power system in which each PV panel includes a maximum power point tracking (MPPT) circuit 90. In the embodiment of FIG. 13, however, the series-connected transformer is eliminated and replaced by a series-connected isolation capacitor C1 which couples the power-line communication circuit 104 to a series-connected power-line bus through terminals PB1 and PB2. A transformer T1 provides additional isolation, as well as possible impedance matching advantages through adjustment of turns ratios. Capacitor C1 may be arranged to minimize the total flux in transformer T1 by blocking DC current flow in the associated transformer winding.

The value of C1 and turns ratio of T1 may be adjusted to maximize the signal coupling efficiency. For example, in one example implementation with a turns ratio of 1:1 for T1, and a value of 2.2 µF for the output capacitor C2, a value of 0.22 µF for C1 may provide a coupled loss of 20 dB, which may be 20 dB better than a coupling with a series-connected transformer, depending on the implementation details.

A further potential benefit of the embodiment of FIG. 13 is that it may significantly reduce the size and/or cost of the primary winding of T1 which no longer needs to carry the full current of the series-connected power-line bus.

Moreover, in some implementations, the transformer T1 may be eliminated entirely because the isolation capacitor C1 providing adequate voltage attenuation, for example, by forming a voltage divider with impedance of the remainder of the power-line communication circuit 104.

Although the embodiment of FIG. 10 is shown with identical couplings for all of the power sub-systems and the gateway interface, various power-line couplings may be mixed in different systems according to some inventive principles of this patent disclosure. For example, in some implementations, the power-line communication systems associated with each power sub-system may be implemented with a capacitively isolated coupling as shown in FIG. 13, while the gateway interface 88 is implemented with a series-connected transformer as shown in FIGS. 11 and/or 12.

Some additional inventive principles of this patent disclosure relate to power systems having power-line communications in which switching power components such as power converters, MPPT circuits, etc., may operate at switching frequencies that are greater than the frequencies used for the power-line communications. In one example implementation, a system may include a power converter coupled to a power bus and having one or more switching frequencies, and a power-line communication circuit coupled to the power bus and having one or more communication frequencies. The operating frequencies may be selected so that at least one of the switching frequencies is substantially greater than at least one of the communication frequencies.

In some embodiments, the one or more switching frequencies and the one or more communication frequencies are substantially static. In other embodiments, at least one of the switching frequencies and/or at least one of the communication frequencies are dynamic, and at least one of the switching frequencies is substantially greater than at least one of the communication frequencies during a substantial percentage of the time the system is operating. Thus, in systems such as resonant systems where the switching frequency may change during operation, the switching frequency may be substantially greater than the communication frequency during at least a substantial percentage of the time the system is operating.

Some of the benefits may be better understood by applying some of the inventive principles in the context of the system of FIG. 13. To provide reasonably efficient coupling and maintain appropriate impedances, it may be beneficial to maintain the values of capacitors C1 and C2 at a ratio of about 10:1, for example, 2.2 µF for the output capacitor C2, a value of 0.22 µF for C1. If the power-line communication frequency is about 100 kHz, operating the MPPT circuit at a switching frequency of about 250 kHz may enable a value of about 2.2 µF to be used for the output capacitor C2. Not only does this reduce the size of the output capacitor, but it may also permit the use of a switching frequency that is high enough to avoid interference that may result if the switching frequency and communication frequency are close.

A relatively high switching frequency may be achieved, for example, by using a multi-phase power converter, e.g., two or more interleaved switching power converters. Such an arrangement may additionally be arranged to provide ripple current cancelation. For example, in the embodiment of FIG. 13, two or more interleaved buck converters may be used to enable high switching frequency operation while reducing ripple current and voltage and enabling the use of a small capacitor for C2.

Some additional inventive principles of this patent disclosure relate to a method including coupling a first power system to a power bus, and coupling a power line communication (PLC) gateway in series with the power bus. The method may further include coupling a second power system to the power bus. The first and second power systems may be coupled in series with the power bus. The first and second power systems may be coupled in parallel with the power bus. method may further include coupling a first PLC module for the first power system to the power bus, and coupling a second PLC module for the second power system to the power bus.

Some additional inventive principles of this patent disclosure relate to a method including coupling a first power circuit in series with a power bus, coupling a second power circuit in series with the power bus, and coupling first and second power-line communication signals associated with the first and second power circuits, respectively, in series to the power bus. The first and second power-line communication signals may be capacitively coupled to the power bus. The first and second power-line communication signals may be coupled to the power bus through transformers, and capacitively coupling the first and second power-line communication signals to the power bus may include blocking DC signals through the transformers.

Some additional inventive principles of this patent disclosure relate to a method including operating a power converter at one or more switching frequencies, and operating a power-line communication circuit associated with the power converter at one or more communication frequencies, where at least one of the switching frequencies is substantially greater than at least one of the communication frequencies. The one or more switching frequencies and the one or more communication frequencies may be substantially static. At least one of the switching frequencies and/or at least one of the communication frequencies may be dynamic, and at least one of the switching frequencies may be substantially greater than at least one of the communication frequencies during a substantial percentage of the time the system is operating.

The inventive principles of this patent disclosure have been described above with reference to some specific example embodiments, but these embodiments can be modified in arrangement and detail without departing from the inventive concepts. Such changes and modifications are considered to fall within the scope of the following claims.

The invention claimed is:

1. A power system for converting a direct current (DC) input from a DC source to an alternating current (AC) output supplied to an AC power bus, the power system comprising:
   a first and a second output;
   a plurality of power subsystems wired in series between the first output and the second output, wherein each power subsystem of the plurality of subsystems comprises:
      a power converter to (i) receive the DC input from a photovoltaic (PV) source and (ii) convert the DC input to a corresponding AC output;
      a power line communication module for communication over the AC power bus based on at least one communication frequency different from a frequency of the AC output supplied to the AC power bus; and
      a transformer for galvanic isolation, wherein each of the plurality of power subsystems is wired in series between the first output and the second output by a primary winding of the corresponding transformer.

2. The power system of claim 1, wherein the plurality of power subsystems comprises a first power subsystem and a second power subsystem, and wherein:
   the first power subsystem is to communicate over the AC power bus based on a first communication frequency; and
   the second power subsystem is to communicate over the AC power bus based on a second communication frequency different from the first communication frequency.

3. The power system of claim 1, wherein the frequency of the AC output is equal to a frequency of an electrical power grid wired to the power system in series.

4. The power system of claim 1, wherein the plurality of power subsystems comprises a first power subsystem and a second power subsystem, and wherein:
   the first power subsystem is to receive a first DC input from a first PV source; and
   the second power subsystem is to receive a second DC input from a second PV source different from the first PV source.

5. The power system of claim 1, wherein the plurality of power subsystems comprises a first power subsystem including a first transformer having a primary winding, wherein the primary winding of the first transformer includes (i) a first terminal electrically coupled to a corresponding power converter of the first power subsystem and (ii) a second terminal electrically coupled to a corresponding power converter of a second power subsystem of the plurality of power subsystems.

6. The power system of claim 5, wherein the corresponding power converter of the first power subsystem is electrically coupled to the first output of the power system.

7. The power system of claim 6, wherein the first output of the power system is electrically coupled to an electrical power grid.

8. The power system of claim 1, wherein a corresponding secondary winding of each transformer is electrically coupled to the power line communication module of the corresponding power subsystem.

9. The power system of claim 1, wherein each power subsystem of the plurality of power subsystems further comprises a maximum power point tracking circuit to increase power received from the PV source.

10. The power system of claim 9, wherein the plurality of power subsystems comprises a first power subsystem;
wherein the first power subsystem comprises (i) a first transformer having a primary winding and a secondary winding, (ii) a first power converter, (iii) a first maximum power point tracking circuit, and (iv) a first power line communication module;
wherein the primary winding of the first transformer includes a first terminal coupled to an output of the first maximum power point tracking circuit and a second terminal coupled to the first power converter; and
wherein the secondary winding of the first transformer includes a first and second terminal both coupled to the first power line communication module.

11. The power system of claim 1, wherein each power subsystem further comprises:
a first housing in which the corresponding transformer is located; and
a second housing separate from the first housing in which components of the corresponding power subsystem other than the transformer are located.

12. The power system of claim 1, wherein the primary windings of the corresponding transformers are electrically coupled to the AC power bus.

13. The power system of claim 1, wherein a corresponding power converter of a first power subsystem of the plurality of power subsystem has a switching frequency greater than a communication frequency of a corresponding power line communication module of the first power subsystem.

14. A method of converting a direct current (DC) input from a DC source to an alternating current (AC) output supplied to an AC power bus, the method comprising:
receiving, by each power subsystem of a plurality of power subsystems wired in series between a first and second output of a power system, a corresponding DC input from a corresponding photovoltaic (PV) source, each power subsystem of the plurality of power subsystems comprising a transformer for galvanic isolation and being wired in series between the first output and the second output by a primary winding of the corresponding transformer;
converting, by each power subsystem, the corresponding DC input to a corresponding AC output; and
communicating, by each power subsystem, over the AC power bus based on at least one communication frequency different from a frequency of the AC output supplied to the AC power bus.

15. The method of claim 14, wherein communicating over the AC power bus comprises:
communicating, by a first power subsystem of the plurality of power subsystems, over the AC bus based on a first communication frequency; and
communicating, by a second power subsystem of the plurality of power subsystems, over the AC bus based on a second communication frequency different from the first communication frequency.

16. The method of claim 14, wherein communicating over the AC power bus comprises communicating over an AC power bus having a frequency equal to a frequency of an electrical power grid wired to the power system in series.

17. The method of claim 14, wherein receiving the corresponding DC input comprises:
receiving a first DC input from a first PV source; and
receiving a second DC input from a second PV source different from the first PV source.

18. The method of claim 14, further comprising supplying, by each power subsystem, the corresponding AC output to the AC power bus.

19. The method of claim 14, wherein communicating over the AC power bus comprises communicating, by at least one power subsystem of the plurality of power subsystems, over the AC power bus based on a communication frequency less than a corresponding switching frequency of a power converter of the at least one power subsystem.

20. A power system for converting one or more direct current (DC) inputs from one or more DC sources to an alternating current (AC) output supplied to a power grid, the power system comprising:
a first and a second output electrically coupled to the power grid;
a gateway for communication over the power grid with components remote to the power system; and
a plurality of power subsystems, wherein the gateway and the plurality of power systems are wired in series by an AC power bus between the first output and the second output, and each power subsystem of the plurality of subsystems comprises:
a power converter to (i) receive a corresponding DC input from a corresponding photovoltaic (PV) source and (ii) convert the corresponding DC input to a corresponding AC output;
a power line communication module for communication over the AC power bus based on at least one communication frequency different from a frequency of an AC power signal supplied to the AC power bus; and
a transformer for galvanic isolation, wherein a primary winding of each corresponding transformer is coupled to the AC power bus.

21. The power system of claim 20, wherein the plurality of power subsystems comprises a first power subsystem including a first transformer having a primary winding,
wherein the primary winding of the first transformer includes (i) a first terminal electrically coupled to a corresponding power converter of the first power subsystem and (ii) a second terminal electrically coupled to a corresponding power converter of a second power subsystem of the plurality of power subsystems.

22. The power system of claim 21, wherein the gateway comprises:
a power line communication module for communication over the power grid based on at least one communication frequency different from a frequency of the power grid; and
a transformer for galvanic isolation.

23. The power system of claim 22, wherein:
the gateway further comprises a transformer having a primary winding;
the power grid comprises a first output and a second output;
the second power subsystem comprises (i) a second power converter and (ii) a second transformer having a primary winding with a first terminal electrically coupled to the second power converter; and
the primary winding of the transformer of the gateway includes (i) a first terminal electrically coupled to the first output of the power grid and (ii) a second terminal electrically coupled to a second terminal of the primary winding of the second power subsystem.

24. The power system of claim 23, wherein a power converter of a third power subsystem of the plurality of subsystems is electrically coupled to the second output of the power grid.

25. The power system of claim 24, wherein:
a secondary winding of the transformer of each corresponding power subsystem is electrically coupled to the power line communication module of the corresponding power subsystem; and
a secondary winding of the transformer of the gateway is electrically coupled to the power line communication module of the gateway.

26. The power system of claim 21, wherein each power subsystem of the plurality of power subsystems further comprises a maximum power point tracking circuit to increase power received from the PV source.

* * * * *